United States Patent [19]

Okawa

[11] Patent Number: 5,136,067
[45] Date of Patent: Aug. 4, 1992

[54] CHLOROFORMYL-FUNCTIONAL ORGANOPOLYSILOXANE

[75] Inventor: Tadashi Okawa, Chiba, Japan

[73] Assignee: Dow Corning Toray Silicone, Ltd., Tokyo, Japan

[21] Appl. No.: 643,256

[22] Filed: Jan. 22, 1991

[30] Foreign Application Priority Data

Feb. 1, 1990 [JP] Japan .................. 2-23010

[51] Int. Cl.$^5$ .................................. C07F 7/08
[52] U.S. Cl. ........................ 556/436; 556/442
[58] Field of Search ................. 556/436, 442

[56] References Cited

U.S. PATENT DOCUMENTS

| | | | |
|---|---|---|---|
| 2,610,199 | 9/1952 | Sommer | 556/436 |
| 3,119,855 | 1/1964 | Bailey et al. | 556/436 |
| 3,629,309 | 12/1971 | Bailey et al. | 556/436 X |
| 4,895,965 | 1/1990 | Langer | 556/439 |

FOREIGN PATENT DOCUMENTS 60-225606 11/1985 Japan .

*Primary Examiner*—Paul F. Shaver
*Attorney, Agent, or Firm*—Alexander Weitz

[57] ABSTRACT

There is disclosed an organopolysiloxane having a molecular weight of 200 to 100,000 which contains at least one silicon-bonded, chloroformyl group-containing organic group, said organopolysiloxane being prepared by reacting (I) the corresponding organopolysiloxane which contains at least one silicon-bonded, triorganosiloxycarbonyl group-containing organic group; and (II) an inorganic halide, such as thionyl chloride. By virtue of its highly reactive chloroformyl group, the organopolysiloxane of the invention find utility as modifiers for polyamide resins, polyester resins, and the like.

20 Claims, No Drawings

CHLOROFORMYL-FUNCTIONAL ORGANOPOLYSILOXANE

FIELD OF THE INVENTION

The present invention relates to a novel organopolysiloxane, and, more particularly, relates both to an organopolysiloxane whose molecule contains at least one silicon-bonded, chloroformyl group-containing organic group as well as to a method for the preparation of same.

BACKGROUND OF THE INVENTION

Organofunctional group-containing organopolysiloxane is employed as a modifier of organic resins through the former's copolymerization with organic resin monomer. This serves to endow the particular organic resin with the weather resistance, surface water repellency, lubricity, biocompatibility, and gas permeability, which are characteristic of the organopolysiloxanes.

Organopolysiloxanes carrying various types of organofunctional groups are known for the modification of organic resins. For example, one can list in this regard amino-modified organopolysiloxanes, epoxy-modified organopolysiloxanes, methacryloxy-modified organopolysiloxanes, carbinol-modified organopolysiloxanes, and carboxylic acid-modified organopolysiloxanes.

Carboxylic acid-modified organopolysiloxane is effective in the particular case of the modification/improvement of polyamide resins, polyester resins, and so forth, because it is reactive with the starting monomers for these organic resins. However, since the copolymerization reaction between the organic resin monomer and carboxylic acid-modified organopolysiloxane is conducted under severe conditions (high temperatures, strong acid/strong base catalysis, etc.), depolymerization of the organopolysiloxane frequently occurs, and the organic resin will not be modified to the anticipated or expected degree. Given these circumstances, demand has arisen within the arena of modifiers for such organic resins for organopolysiloxane which, by virtur of possessing highly reactive organofunctional groups, would be capable of facile copolymerization with the aforesaid organic resin monomer under mild conditions. Organopolysiloxane carrying an Si-bonded, chloroformyl group-containing organic group, a group which would be very reactive in particular with the starting monomer for such organic resins as polyamide resins and polyester resins, could be expected to be an excellent modifier for such organic resins.

Chloroformyl group-containing organic compounds are generally prepared by the reaction of inorganic halide (for example, thionyl chloride) with organic carboxylic acid. Hydrochloric acid, a protonic acid, is generated as a by-product in this case. When this method is applied to carboxylic acid-modified organopolysiloxane, the silicon-oxygen bond, which has a high degree of ionic bond character, is attacked by the protonic acid, and secondary reactions occur in the form of siloxane bond scission, rearrangement, and redistribution. This makes it impossible to obtain the desired organopolysiloxane carrying the Si-bonded, chloroformyl group-containing organic group in its molecular chain.

In another approach, an addition reaction was attempted between chloroformyl-substituted unsaturated hydrocarbon and SiH-containing organopolysiloxane in the presence of a Group VIII transition metal complex catalyst, but this addition reaction did not in fact proceed and the desired organopolysiloxane carrying the Si-bonded, chloroformyl group-containing organic group in its molecular chain was not obtained.

SUMMARY OF THE INVENTION

In view of the preceding, the present inventor carried out extensive research which was directed toward the development of organopolysiloxane whose molecule contains at least 1 Si-bonded, chloroformyl group-containing organic group, as well as toward the development of a method for the preparation of same. They discovered as a result that the reaction of inorganic halide (for example, thionyl chloride) with organopolysiloxane whose molecular chain contains the Si-bonded, triorganosiloxycarbonyl group-containing organic group, results in conversion of the triorganosilylcarbonyl group into the chloroformyl group. It was also discovered that siloxane bond scission does not occur under these conditions since the by-product in this case is a triorganochlorosilane, which is not a protonic acid.

The present invention takes as its object the preparation of an organopolysiloxane whose molecular chain contains a silicon-bonded, chloroformyl group-containing organic group, which is highly reactive with organic resin monomers, for use in the modification of organic resins. The present invention therefore relates to an organopolysiloxane prepared by reacting (I) an organopolysiloxane having a molecular weight of 200 to 100,000 which contains at least one silicon-bonded, triorganosiloxycarbonyl group-containing organic group; and (II) an inorganic halide.

DETAILED DESCRIPTION OF THE INVENTION

To explain the preceding in greater detail, each molecule of the organopolysiloxane of the present invention must contain at least one silicon-bonded, chloroformyl group-containing organic group, that is, a group represented by the following general formula

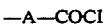

—A—COCl wherein A is a divalent organic group, which is exemplified by alkylene groups, such as ethylene, propylene, and butylene, and by alkyleneoxyalkylene groups such as propyleneoxypropylene and propyleneoxypentylene. Other than the chloroformyl-containing organic group(s), the organic groups in the organopolysiloxane of the present invention are exemplified by alkyl groups such as methyl, ethyl, propyl, butyl, pentyl, hexyl, and so forth; by aryl groups such as phenyl, tolyl, xylyl, and so forth; and by aralkyl groups such as benzyl, phenethyl, and so forth. The present invention's organopolysiloxane should have a molecular weight of about 200 to about 100,000 for the following reasons. When its molecular weight falls below about 200, the organopolysiloxane evidences only an unsatisfactory capacity for modifying organic resins; when its molecular weight exceeds about 100,000, the compatibility with organic resin monomer declines and the copolymerizability with organic resin monomer diminishes.

Organopolysiloxane according to the present invention is readily prepared by the reaction of inorganic halide with organopolysiloxane whose molecule contains at least one silicon-bonded, triorganosiloxycarbonyl group-containing organic group.

Thus, the present invention makes use of organopolysiloxane whose molecule contains at least one silicon-bonded, triorganosiloxycarbonyl group-containing organic group as represented by the following general formula $$\equiv Si-A-COOSiR_3$$

In the preceding formula, A is the divalent organic group described above, while R is a monovalent organic group as exemplified by alkyl groups, such as methyl, ethyl, and propyl, and by aryl groups, such as phenyl, and tolyl. This organopolysiloxane is reacted with an inorganic halide to afford the present invention's organopolysiloxane whose molecule contains at least one silicon-bonded, chloroformyl group-containing organic group. The aforesaid organopolysiloxane whose molecule contains at least one silicon-bonded, triorganosiloxycarbonyl group-containing organic group may be synthesized by an addition reaction between SiH-containing organopolysiloxane and triorganosiloxycarbonyl group-containing unsaturated hydrocarbon in the presence of a Group VIII transition metal complex catalyst.

Inorganic halides which may be deployed within the context of the present invention are exemplified by phosphoryl chloride, thionyl chloride, phosphorus pentachloride, and phosphorus trichloride, inter alia. The skilled artisan will readily select those inorganic halides which will operate in the method of the present invention based on experience with the corresponding organic reaction. Among these, thionyl chloride is preferred because of its low boiling point and the fact that the reaction by-products are gaseous or low-boiling substances which serve to facilitate product isolation.

With regard to the reaction between inorganic halide and organopolysiloxane whose molecule contains at least 1 silicon-bonded, triorganosiloxycarbonyl group-containing organic group, this reaction should be carried out using at least 1 equivalent, but preferably using at least 5 equivalents, of the former per equivalent of the latter. While this reaction is preferably carried out without the use of solvent, it may be conducted in the presence of solvent. Examples of the solvent are aromatic solvents, such as benzene, toluene, and xylene, and aliphatic solvents, such as hexane and heptane. This reaction may be run at room temperature, but implementation at temperatures of 50 to 200 degrees Centigrade will be advantageous in terms of the reaction rate.

EXAMPLES

The present invention is explained in greater detail through the following illustrative examples, but is not restricted thereby. In these examples, Me denotes a methyl radical and n-Bu denotes a n-butyl radical.

COMPARISON EXAMPLE 1

The following were charged to a stirrer-equipped four-neck flask and heated with stirring for 3 hours at 80 degrees Centigrade: 6.56 grams (55.2 millimoles) thionyl chloride and 9.6 grams (5.52 millimoles) of an organopolysiloxane represented by the average formula

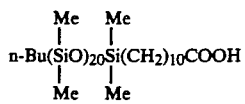

This organopolysiloxane had a molecular weight distribution = 1.19 according to gel permeation chromatography (GPC). After confirmation of the disappearance of the absorption characteristic of carboxylic acid by infrared absorption spectroscopic analysis (IR), 9.7 grams of product was recovered by distillation of low-boiling components by heating in vacuo. This product was confirmed by nuclear magnetic resonance analysis (NMR) and IR to be an organopolysiloxane with the following average formula

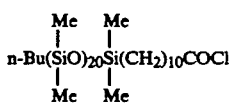

The following were mixed and stirred overnight at room temperature: 7 grams (3.98 millimoles) of the organopolysiloxane prepared above, 1.27 grams (39.8 millimoles) methanol, 0.81 grams (7.96 millimoles) triethylamine, and 20 milliliters toluene. The salt by-product was removed by filtration, and 5.1 grams product was recovered by distillation of the low-boiling components by heating in vacuo. This product was confirmed by NMR and IR to be organopolysiloxane with the following average formula

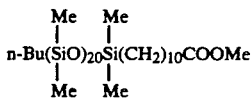

However, this organopolysiloxane had a GPC-based molecular weight distribution of 1.7, which confirmed the occurrence of siloxane bond scission as well as rearrangement and redistribution during the chloroformylation reaction.

COMPARISON EXAMPLE 2

The following were charged to a stirrer-equipped four-neck flask: 12.56 grams (79.88 millimoles) unsaturated carboxylic acid chloride as represented by the following formula $$CH_2=CHCH_2OCH_2CH_2COCl$$

32.96 grams (79.87 millimoles) oligosiloxane as represented by the following formula

and platinum/tetramethyldivinylsiloxane complex in a quantity sufficient to provide 200 ppm platinum metal referred to the total quantity of the first two reactants. After stirring for 10.5 hours with heating to 90 degrees Centigrade and then sampling, disappearance of the starting acid chloride was confirmed by gas/liquid chromatography (GLC). The major product was isolated by distillation in vacuo. Investigation by NMR and IR could not confirm the production of

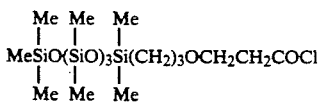

but the production of

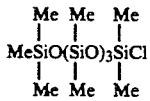

was confirmed.

EXAMPLE 1

Thionyl chloride (8.96 grams; 75.35 millimoles) and 10 grams (15.94 millimoles) oligosiloxane with the following formula

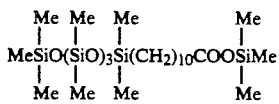

were introduced into a stirrer-equipped four-neck flask. After stirring for 1 hour with heating at 60 degrees Centigrade, disappearance of the starting oligosiloxane was confirmed by GLC, and 8.6 grams product was recovered by distillation of the low-boiling components by heating in vacuo. This was confirmed by NMR and IR to have the following formula

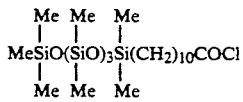

EXAMPLE 2

Twelve grams (20.94 millimoles) of an oligosiloxane having the structure

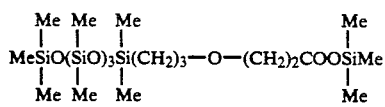

and 12.48 grams (104.86 millimoles) thionyl chloride were introduced into a stirrer-equipped four-neck flask. Upon stirring for 3 hours at 75 degrees Centigrade, disappearance of the absorption characteristic of trimethylsilyl carboxylate was confirmed by IR. The product (7.1 grams) was recovered by distillation in vacuo. This was confirmed by NMR and IR to have the following formula

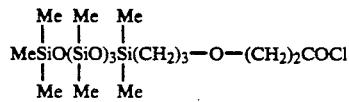

EXAMPLE 3

The following were charged to a stirrer-equipped four-neck flask and stirred for 3 hours with heating at 80 degrees Centigrade: 10 grams (5.52 millimoles) organopolysiloxane (molecular weight distribution by GPC=1.17) with the following average formula

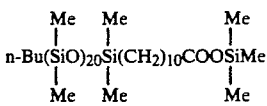

and 6.56 grams (55.2 millimoles) thionyl chloride. The disappearance of the absorption characteristic of trimethylsilyl carboxylate was confirmed by IR, and 9.7 grams product was recovered by distillation of the low-boiling components by heating in vacuo. This product was confirmed by NMR and IR to be an organopolysiloxane with the following average formula

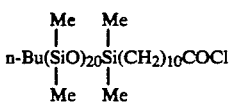

Seven grams (3.98 millimoles) of this organopolysiloxane, 1.27 grams (39.8 millimoles) methanol, 0.81 grams (7.96 millimoles) triethylamine, and 20 milliliters toluene were mixed and stirred overnight at room temperature. The salt by-product was removed by filtration, and 5.1 grams product was obtained by distillation of the low-boiling components by heating in vacuo. This product was confirmed by NMR and IR to be an organopolysiloxane with the following average formula

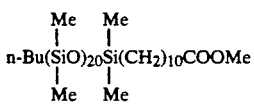

The molecular weight distribution of this organopolysiloxane was 1.16 by GPC, which thus confirmed the complete absence of siloxane bond scission and rearrangement/redistribution during the chloroformylation reaction.

EXAMPLE 4

The following were placed in a stirrer-equipped four-neck flask and reacted by heating for 8 hours at 75 degrees Centigrade: 12 grams (23.30 millimoles) oligosiloxane with the following formula

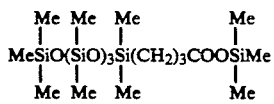

and 13.86 grams (116.49 millimoles) thionyl chloride. After standing overnight, disappearance of the absorption characteristic of trimethylsilyl carboxylate ester was confirmed by IR, and 6.7 grams product was recovered by distillation in vacuo. This product was confirmed by NMR and IR to have the following structure

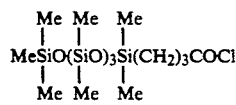

EXAMPLE 5

The following were placed in a stirrer-equipped four-neck flask and stirred for 3.5 hours while heating to 75 degrees Centigrade: 10 grams (15.45 millimoles) oligosiloxane with the following formula

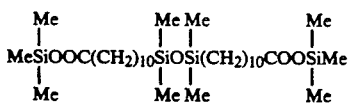

and 9.19 grams (77.25 millimoles) thionyl chloride. Disappearance of the absorption characteristic of trimethylsilyl carboxylate was confirmed by IR, and 7.8 grams product was recovered by distillation of the low-boiling components by heating in vacuo. This product was confirmed by NMR and IR to have the following formula

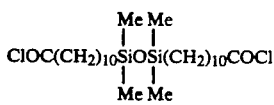

That which is claimed is:

1. An organopolysiloxane having a molecular weight of 200 to 100,000 which contains at least one silicon-bonded, chloroformyl group-containing organic group, said organopolysiloxane being prepared by reacting
    (I) an organopolysiloxane having a molecular weight of 200 to 100,000 which contains at least one silicon-bonded, triorganosiloxycarbonyl group-containing organic group; and
    (II) an inorganic halide, there being essentially no siloxane bond scission of said organopolysiloxane (I) resulting from the reaction.

2. The organopolysiloxane of claim 1, wherein said inorganic halide (II) is selected from the group consisting of thionyl chloride, phosphoryl chloride, phosphorous pentachloride and phosphorous trichloride.

3. The organopolysiloxane of claim 2, wherein the silicon-bonded, triorganosiloxycarbonyl group-containing organic group of said organopolysiloxane (I) is represented by the formula —A—C(O)OSiR$_3$ wherein A is a divalent organic group, and R is a monovalent organic group.

4. The organopolysiloxane of claim 2, wherein said organopolysiloxane (I) is a diorganopolysiloxane having at least one molecular end terminated with a silicon-bonded group having the formula —A—C(O)OSiR$_3$ wherein A is a divalent organic group, and R is a monovalent organic group.

5. The organopolysiloxane of claim 4, wherein said diorganopolysiloxane is a polydimethylsiloxane.

6. The organopolysiloxane of claim 5, wherein each R is a methyl radical.

7. The organopolysiloxane of claim 6, wherein group A is an alkylene group having 1 to 10 carbon atoms.

8. The organopolysiloxane of claim 5, wherein said polydimethylsiloxane has at one of its terminals a silicon-bonded group of the formula —A—C(O)OSiR$_3$ and at its other terminal a group of the formula R$_3$SiO—, wherein A is a divalent organic group, and R is a monovalent organic group.

9. The organopolysiloxane of claim 8, wherein each R is a methyl radical.

10. The organopolysiloxane of claim 9, wherein group A is an alkylene group having 1 to 10 carbon atoms.

11. In a method for preparing an organopolysiloxane having at least one silicon-bonded, chloroformyl group-containing organic group, the improvement comprising reacting
    (I) an organopolysiloxane having a molecular weight of 200 to 100,000 which contains at least one silicon-bonded, triorganosiloxycarbonyl group-containing organic group; and
    (II) an inorganic halide, there being essentially no siloxane bond scission of said organopolysiloxane (I) resulting from the reaction.

12. The method of claim 11, wherein said inorganic halide (II) is selected from the group consisting of thionyl chloride, phosphoryl chloride, phosphorous pentachloride and phosphorous trichloride.

13. The method of claim 12, wherein the silicon-bonded, triorganosiloxycarbonyl group-containing organic group of said organopolysiloxane (I) is represented by the formula —A—C(O)OSiR$_3$ wherein A is a divalent organic group, and R is a monovalent organic group.

14. The method of claim 12, wherein said organopolysiloxane (I) is a diorganopolysiloxane having at least one molecular end terminated with a silicon-bonded group having the formula —A—C(O)OSiR$_3$ wherein A is a divalent organic group, and R is a monovalent organic group.

15. The method of claim 14, wherein said diorganopolysiloxane is a polydimethylsiloxane.

16. The method of claim 15, wherein each R is a methyl radical.

17. The method of claim 16, wherein group A is an alkylene group having 1 to 10 carbon atoms.

18. The method of claim 15, wherein said polydimethylsiloxane has at one of its terminals a silicon-bonded group of the formula —A—C(O)OSiR$_3$ and at its other terminal a group of the formula R$_3$SiO—, wherein A is a divalent organic group, and R is a monovalent organic group.

19. The method of claim 18, wherein each R is a methyl radical.

20. The method of claim 19, wherein group A is an alkylene group having 1 to 10 carbon atoms.

* * * * *